United States Patent
Glase et al.

(10) Patent No.: US 12,353,824 B2
(45) Date of Patent: Jul. 8, 2025

(54) SYSTEMS AND METHODS FOR IMPROVED USER-REVIEWER INTERACTION USING ENHANCED ELECTRONIC DOCUMENTS

(71) Applicant: BOLD Limited, Hamilton (BM)

(72) Inventors: John Glase, San Juan, PR (US); Kip Daynard, Huntsville (CA); James Freundlich, San Juan, PR (US)

(73) Assignee: BOLD Limited, Hamilton (BM)

( * ) Notice: Subject to any disclaimer, the term of this patent is extended or adjusted under 35 U.S.C. 154(b) by 0 days.

(21) Appl. No.: 17/592,669

(22) Filed: Feb. 4, 2022

(65) Prior Publication Data

US 2022/0374592 A1 Nov. 24, 2022

Related U.S. Application Data

(60) Provisional application No. 63/191,249, filed on May 20, 2021.

(51) Int. Cl.
*G06F 40/186* (2020.01)
*G06F 3/04842* (2022.01)
*G06F 16/93* (2019.01)
*G06F 16/955* (2019.01)
(Continued)

(52) U.S. Cl.
CPC ........ *G06F 40/186* (2020.01); *G06F 3/04842* (2013.01); *G06F 16/94* (2019.01); *G06F 16/955* (2019.01); *G06F 40/103* (2020.01); *G06F 40/134* (2020.01)

(58) Field of Classification Search
CPC .... G06F 40/103; G06F 40/134; G06F 40/186; G06F 3/04842
See application file for complete search history.

(56) References Cited

U.S. PATENT DOCUMENTS

| | | | |
|---|---|---|---|
| 2011/0313963 A1* | 12/2011 | Liu | G06Q 10/06 706/48 |
| 2015/0127565 A1* | 5/2015 | Chevalier | H04W 4/21 705/319 |
| 2019/0138649 A1 | 5/2019 | Sullivan et al. | |

(Continued)

FOREIGN PATENT DOCUMENTS

WO  WO-2019021048 A1 * 1/2019

OTHER PUBLICATIONS

Anonymous, Why is my application asking for my race and gender?, a blog article found at https://www.cangrade.com/blog/talent-acquisition/why-is-my-application-asking-my-race-gender/, Cangrade, Mar. 29, 2017, 6 pages (Year: 2017).*

(Continued)

*Primary Examiner* — Scott T Baderman
*Assistant Examiner* — Seung Woon Jung
(74) *Attorney, Agent, or Firm* — Dinsmore & Shohl LLP

(57) ABSTRACT

This present application relates to an enhanced document having a collection of fields including human readable information as well as machine retrievable information to create a collection of information relating to an applicant. The document includes both established segments relating to a first set of determined categories and a second group of data sets that are affiliated with the first set to provide an enhanced group of criteria for the applicant. The supplemental information is retrievable by use of one or more actuatable buttons that connect the user to a website to obtain the requested information.

16 Claims, 6 Drawing Sheets

(51) Int. Cl.
  *G06F 40/103* (2020.01)
  *G06F 40/134* (2020.01)

(56) References Cited

U.S. PATENT DOCUMENTS

| | | | |
|---|---|---|---|
| 2020/0117678 A1* | 4/2020 | Woodings | G06Q 10/06311 |
| 2021/0182282 A1* | 6/2021 | Silverstein | G06F 40/143 |
| 2021/0271803 A1* | 9/2021 | Seymour | G06F 15/0291 |

OTHER PUBLICATIONS

International Search Report and Written Opinion dated Jun. 2, 2022, from the corresponding International Application No. PCT/US2022/020869.

Raggett Dave et al: "HTML 4.0 Specification", Sep. 24, 1998 (Sep. 24, 1998), pp. 1-367, XP055869108, Retrieved from the Internet: URL:https://www.w3.org/TR/1998/REC-html40-19980424/html40.pdf.

Anonymous: "Ajax (programming)—Wikipedia", Nov. 14, 2020 (Nov. 14, 2020), pp. 1-9, XP055910596, Retrieved from the Internet: URL:https://en.wikipedia.org/w/index.php?title=Ajax_(programming)&oldid=988729323 [retrieved on Apr. 7, 2022].

The International Bureau of WIPO, International Preliminary Report on Patentability for International Patent Application No. PCT/US2022/020869, dated Nov. 21, 2023, 9 pages.

* cited by examiner

FIG. 2

Block 140:
- COMMUNICATION INTERFACES 241
- WIFI COMMUNICATION INTERFACE
- LAN COMMUNICATION INTERFACE
- PROCESSOR(S) 242
- STORAGE DEVICE 244
- MEMORY 243
- DOCUMENT REVIEW PORTAL LOGIC 245

Block 170:
- COMMUNICATION INTERFACES 271
- WIFI COMMUNICATION INTERFACE
- LAN COMMUNICATION INTERFACE
- PROCESSOR(S) 272
- STORAGE DEVICE 274
- MEMORY 273
- DOCUMENT INTERACTION PORTAL LOGIC 275

Block 130:
- COMMUNICATION INTERFACES 231
- WIFI COMMUNICATION INTERFACE
- LAN COMMUNICATION INTERFACE
- PROCESSOR(S) 232
- STORAGE DEVICE 234
- MEMORY 233
- METADATA EXTRACTION LOGIC 235
- DECODING LOGIC 238

Block 110:
- COMMUNICATION INTERFACES 211
- WIFI COMMUNICATION INTERFACE
- LAN COMMUNICATION INTERFACE
- PROCESSOR(S) 212
- STORAGE DEVICE 114
- SKIN LIBRARY 114A
- MEMORY 213
- DOCUMENT CREATION PLATFORM LOGIC 220
- ENCODING LOGIC 221
- DESENSITIZATION LOGIC 222
- RENDERING LOGIC 223
- ELEMENT SERVICE LOGIC 224
- EMBEDDING LOGIC 225
- ELEMENT DEF. DB 215
- DOCUMENT DB 216
- USER-REVIEWER DATA 217
- USER DB 218

Block 160:
- COMMUNICATION INTERFACES 261
- WIFI COMMUNICATION INTERFACE
- LAN COMMUNICATION INTERFACE
- PROCESSOR(S) 262
- STORAGE DEVICE 264
- MEMORY 263
- DOCUMENT SUBMISSION PLATFORM LOGIC 265

SYSTEMS AND METHODS FOR IMPROVED USER-REVIEWER INTERACTION USING ENHANCED ELECTRONIC DOCUMENTS

CROSS-REFERENCE TO RELATED APPLICATIONS

This application claims priority to U.S. Provisional Application Ser. No. 63/191,249, filed May 20, 2021, the entire contents of which are hereby incorporated by reference in their entirety.

BACKGROUND OF THE INVENTION

Field of the Invention

The following disclosure generally relates to systems and methods for improved communication and interaction between a user submitting a document and a recipient of the document through the use of an enhanced interactive electronic document.

Background

Electronic documents are frequently submitted by users through a document submission system (e.g., a website or other online system) for review and processing. By way of example, a job seeker will typically prepare a precisely formatted resume, cover letter, or the like (e.g., as a Microsoft Word DOCX or Adobe Acrobat PDF file) that they may upload and submit as part of an online job application (e.g., through an employer's website, a job application board, a social media platform, or the like). The application, including the documents uploaded by the job seeker, will frequently be forwarded to and processed through an applicant tracking system (ATS), or other document review system, which may allow a recruiter or human resources (HR) personnel at a hiring entity to review the application and take appropriate action (e.g., contacting the job applicant to schedule an interview, requesting additional information, etc.). The ATS may process the uploaded documents in order to facilitate review by the recruiter or HR personnel, for example, by generating a document "preview" that the recruiter may view and interact with through a portal provided by the ATS system. The ATS may also process the uploaded documents to automatically extract information therefrom to be used by the ATS system, and may rely on a document parsing system or integrated parsing software to do so.

The problem with traditional document submission and review systems is that they do not provide a convenient mechanism for the recipient of the electronic document (i.e., the company operating the website, or an employee thereof) to interact with the user submitting the electronic document for processing. For instance, in the resume submission context, a job applicant will frequently experience what is known as the "black hole" problem. That is, after submission of their resume for a job application, a job applicant may not hear back from the prospective employer regarding the status of their application, leading to frustration and anxiety on behalf of the job applicant. While some electronic document submission systems may provide an initial confirmation to the user upon first receipt of the electronic document (e.g., generating a form response thanking a user for submitting the document), such responses are typically machine generated and provide little, if any, substantive information to the user. The user, moreover, does not receive further communication regarding processing of the document beyond this initial confirmation (e.g., by a document review system). A job applicant is kept in the dark as to the status of their application (e.g., whether their resume reached a human reviewer, was passed on for further consideration by a hiring manager, or whether it was rejected) and is left to wonder as to what may have happened.

Furthermore, the user submitting the document is unable to follow up regarding the particular document submission. Job applicants, for instance, frequently wish to supplement the information provided in their resumes, provide updated or additional relevant information, or simply, show continued interest in a position. Applicants will often make "cold calls" or send unsolicited e-mails in an attempt to obtain an update as to the status of their application. But the user is unlikely to reach the right HR personnel, or even receive a response, and invariably find themselves in the "black hole" once again. This "black hole" problem does little to endear the applicant to the potential employer and may leave the applicant feeling as though the employer is disinterested, even if this is not the case. The applicant may be turned off by the lack of responsiveness or otherwise conclude to move on in their job search.

At the same time, the operator of the document submission system frequently finds itself overwhelmed by the number of document submissions it receives. For example, an employer may have a number of job openings it is looking to fill and may solicit job applications for each position through a number of different channels (e.g., through the employer's website, various job application boards, and social media platforms like LinkedIn). In the aggregate, the employer may receive hundreds if not thousands of applications and resume submissions for processing. While an ATS or other document review system may assist human resources personnel with reviewing and filtering these resumes to identify a suitable subset of candidates, the prospect of engaging with each candidate may be overwhelming. For example, it may involve the coordination of screening calls, requests for additional information (e.g., salary preferences, work status, etc.), and/or scheduling of interviews with hiring managers and other key personnel. Performing such tasks and managing communication with each candidate can be quite onerous, requiring an HR employee to interface with a number of separate applications and tools in order to do so.

A need thus exists for systems and methods that facilitate communication and interaction between a user submitting an electronic document for processing and the recipient of the document.

BRIEF SUMMARY OF THE INVENTION

The systems and methods disclosed herein seek to address the above-mentioned limitations in traditional document submission and review systems through the use of an enhanced interactive electronic document having one or more interactive elements embedded therein. The interactive elements within the enhanced documents, when submitted through a capable document submission and review system, help facilitate communication and interaction between the user submitting the document and a reviewer of the document submission.

BRIEF DESCRIPTION OF THE DRAWINGS

The accompanying drawings, which are incorporated herein and form part of the specification, illustrate one or more aspects of the present invention and, together with the description, further serve to explain the principles of the invention and to enable a person skilled in the relevant art(s) to make and use the invention.

FIG. 2 illustrates a more detailed view of the enhanced document creation system, document submission system, document parsing system, and user-reviewer interface system, as well as their constituent components.

Figure 1:
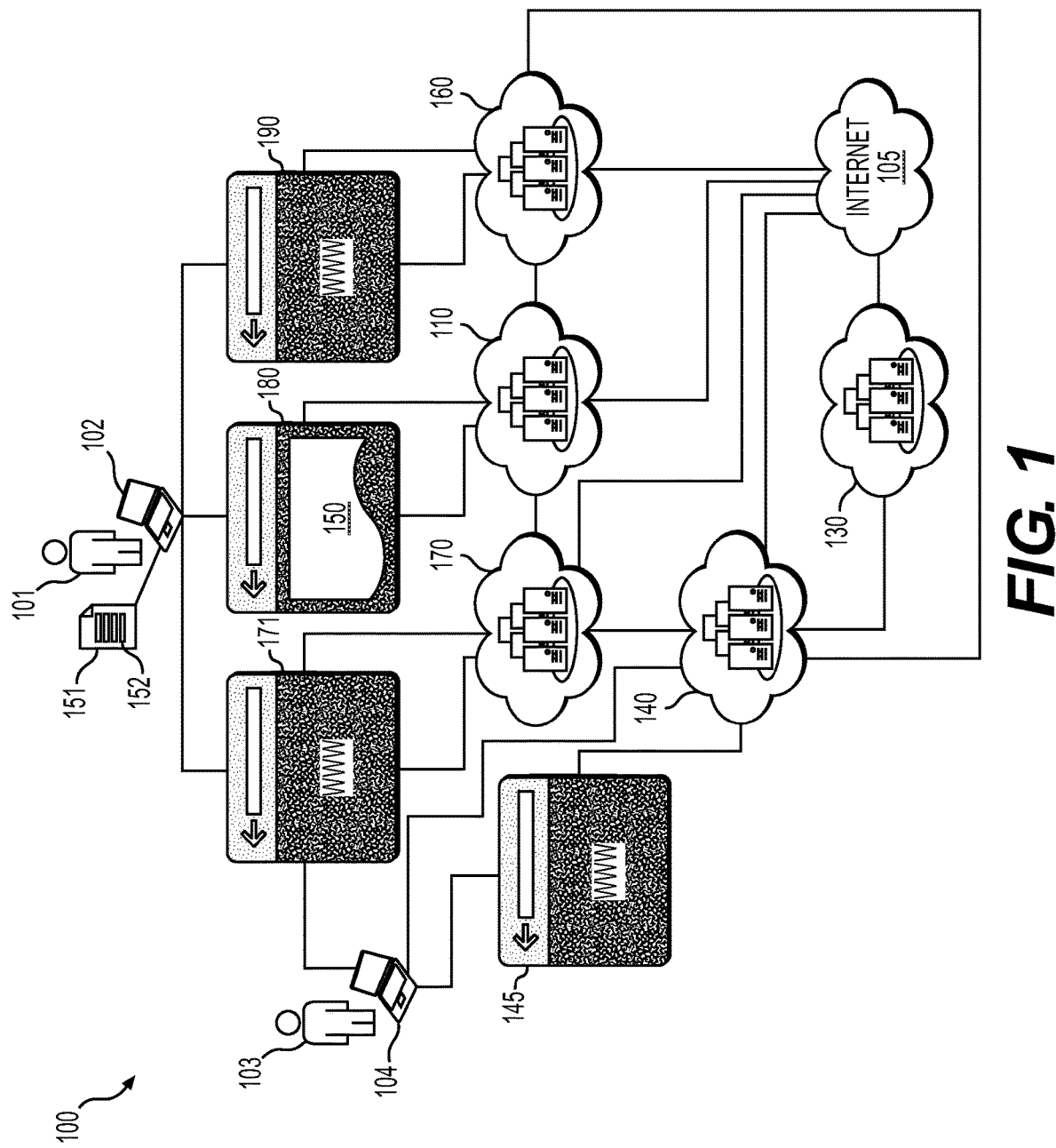
FIG. 1 illustrates an exemplary environment in which the systems and methods of the present invention may be used.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. Unless otherwise indicated, the drawings provided throughout the disclosure should not necessarily be interpreted as to-scale drawings.

DETAILED DESCRIPTION

FIG. 1 illustrates an exemplary environment 100 in which the systems and methods of the present invention may be deployed. As illustrated, the environment may include a document creation system 110, a document submission system 160, a document parsing system 130, a document review system 140, a user-reviewer interface system 170, and one or more users 101 and reviewers 103, which may be able to communicate and interact with one another over the Internet 105. Each user 101 may have a user device 102 (e.g., a personal computer, a cellular telephone, a PDA, or the like), which the users 101 may use to interact with enhanced document creation system 110, document submission system 160, and user-reviewer interface system 170. Similarly, each reviewer 103 may have a reviewer device 104 (e.g., a personal computer, a cellular telephone, a PDA, or the like), which the reviewers 103 may use to interact with document review system 140 and user-reviewer interface system 170.

For example, in one exemplary mode of operation, user 101 may create an enhanced document 151 (e.g., a resume having interactive elements 152), using a document creation platform 180 hosted by the enhanced document creation system 110 (e.g., a resume creation platform a la www.myperfectresume.com or www.zety.com). In creating the enhanced document 151, user 101 may be able to add or include one or more interactive elements 152, which may allow a reviewer 103 to take action with respect to the enhanced document 151. In doing so, user 101 may be directed to a document interaction platform 171 hosted by the user-reviewer interface system 170, which, in turn, may trigger the execution of logic associated with the interactive element 152 that was selected. The user-reviewer interface system 170, for example, may prompt the user 101 to enter information needed to execute the associated logic (e.g., information needed to support the functionality to be provided by the interactive element 152), and/or call or otherwise trigger a function or service (e.g., by calling a public facing service of the enhanced document review system 110, document submission system 160, document review system 140, document parsing system 130, and/or a third-party system). The user-reviewer interface system 170, for instance, may present the user 101 with a series of one or more prompts soliciting information needed to support the functionality of the interactive element 152, or may automatically retrieve the necessary information (e.g., from enhanced document creation system 110 or an external website). Once finalized, the user 101 may export the enhanced document 151 in a particular file format, which the user 101 may then upload and submit to document submission system 160 (e.g., a job application board, recruiting portal, or the like).

Document submission system 160 may pass the enhanced document 151 along to the document review system 140, which may automatically process the enhanced document 151 and present it to reviewer 103 through a document review portal 145, through which the reviewer 103 may review the enhanced document 151 (e.g., allowing the reviewer 103 to download the enhanced document 151 and/or presenting a "preview" of the enhanced document 151 through the document review portal 145). In doing so, the document review system 140 may reach out to document parsing system 130 to help parse the enhanced document 151, which may return the contents of the enhanced document 151 in a structured form (or multiple forms) usable by the document review system 140. The reviewer 103 may then be able to take action with respect to the enhanced document 151 using the interactive elements 152 provided therein.

In doing so, the reviewer 103 may be directed to the document interaction platform 171 of the user-reviewer interface system 170, which, in turn, may trigger the execution of logic associated with the interactive element 152 that was selected. The user-reviewer interface system 170, for example, may re-direct the reviewer 103 to an external website, prompt the reviewer 103 to enter additional information needed in order to execute the associated logic, and/or call or otherwise trigger a function or service (e.g., by calling a public facing service of the enhanced document review system 110, document submission system 160, document review system 140, document parsing system 130, and/or a third-party system). The user-reviewer interface system 170 may also provide the user 101 with a notification with details regarding the reviewer's action (e.g., via an SMS message, e-mail message, mobile application, or user dashboard provided through document interaction platform 171). The notification may also indicate whether further action by the user 101 is necessary, or whether optional actions can be taken, and may direct the user 101 to the document interaction platform 171 to do so (e.g., through an interactive element 152 or hyperlink provided therein). If the user 101 does take action, a similar notification may be sent to the reviewer 103, and the user 101 and reviewer 103 may be able to actively engage with one another as desired. In this way, user-reviewer interface system 170 is able to facilitate better communication and interaction between the user 101 and reviewer 103. In some cases, the document review system 140 may have an arrangement or relationship with the enhanced document creation system 110 and/or user-reviewer interface system 170, which may allow for the above-mentioned communications and interactions to be integrated within the document review system 140 and/or document review portal 145 itself.

The foregoing description provides a high-level overview of one non-limiting mode of system operation. The description that follows provides additional details regarding the systems, features and functionality described, and covers additional and/or alternative embodiments contemplated by the inventors. While the description that follows may refer to a job applicant and employer context to illustratively describe the various systems and their operation, it should be appreciated that the invention is not thus limited and can be naturally extended to any number of additional contexts.

As noted above, the enhanced document creation system 110 may host a document creation platform 180 that users 101 may interface with over the Internet 105 (e.g., using a web browser on user device 102) to create and format an initial document 150, view and update the document, and export the document as enhanced document 151 having one or more interactive elements 152 provided therein. The interactive elements 152 may take the form of a button, image, machine-readable code (e.g. barcode, QR code, etc.), and/or formatted text and may have a hyperlink associated therewith, which may allow a reviewer 103 of the enhanced document 151 to take action with respect to the document and/or its submission (e.g., through document submission system 160).

The interactive elements 152, for example, may allow the reviewer 103 to quickly assess whether the user 101 or submission meets certain minimum requirements, view additional information not included within the enhanced document 151, contact the user 101 who submitted the enhanced document 151, or otherwise interact with the user 101. The interactive elements 152, for instance, may provide an update to the user 101 regarding the status of the document submission (e.g., whether there was an error with the submission, whether the document was under review, whether the submission was approved or denied), request additional information or documents from the user 101, or initiate communication with the user 101 (e.g., by sending an e-mail or text message to the user 101, initiating a telephone or VoIP call to the user 101, or sending the user 101 a notification through a user dashboard 175 hosted by the user-reviewer interface system 170). In some cases, the interactive elements 152 might call upon third-party systems or services to interact with the user 101, for example, allowing a reviewer 103 to view the user's calendar and/or schedule an appointment with the user 101 (e.g., through public facing Google Calendar, Microsoft Outlook, or Apple iCal APIs).

The document creation platform 180 may allow users 101 to create an initial document 150 in a number of different ways, for example, by presenting the user 101 with a fillable form, a document template, a wizard that prompts the user 101 for specific information, a WYSWIG editor, or the like. The document creation platform 180 may also allow a user 101 to select a skin or style template to apply to the document, which may help to ensure that the initial document 150 (and enhanced document 151, when exported) has a uniform appearance. As used herein, the term "skin" refers to a custom graphical appearance preset package that is applied to the initial document 150 after creation. Initial documents 151 created with the same skin or style template will have a similar look and appearance, though the content of the initial document 151 will differ. When creating the initial document 150, the user 101 may be able to add or include one or more interactive elements 152. The interactive elements 152, for example, may be included as part of the document template, included in response to specific prompts in the document creation wizard (e.g., asking the user 101 whether they wish to add one or more interactive elements 152 and/or a section for interactive elements 152), or selected from a list of interactive elements 152 presented to the user 101 through the document creation platform 180 (e.g., as a widget provided in the WYSWIG editor).

When adding the interactive elements 152, the user 101 may be directed to a document interaction platform 171 hosted by the user-reviewer interface system 170, which, in turn, may trigger the execution of logic associated with the interactive element 152 that was selected. The user-reviewer interface system 170, for example, may prompt the user 101 to enter additional information needed in order to execute the associated logic, and/or call or otherwise trigger a function or service (e.g., by calling a public facing service of the enhanced document review system 110, document submission system 160, document review system 140, document parsing system 130, and/or a third-party system). For instance, where the interactive element 152 is intended to allow a reviewer 103 to schedule a meeting or appointment with the user 101, the user 101 may need to provide information regarding their availability (e.g., specific dates and times, a link to their calendar, etc.). The user 101, through the document interaction platform 171, may be funneled through a series of prompts soliciting the required information. The information provided by user 101 may be returned to the enhanced document creation system 110 and stored (e.g., in user-reviewer data database 217 in association with a unique document and/or element identifier) for later retrieval (e.g., when the reviewer 103 selects the interactive element 152).

Once added, the user 101 may be able to customize the appearance of the interactive elements 152, for example, by adjusting their attributes (e.g., background color, visible text or image, etc.) and/or position within the document, allowing the user 101 to feature the interactive elements as prominently or subtly as desired. In some cases, the appearance of the interactive elements 152 may be governed in part, or in whole, by an associated skin or style template (e.g., of the element itself or the document as a whole), which the user 101 may be able to select and/or change through the document creation platform 180. In other cases, the document creation platform 180 may limit the user's ability to customize the appearance of the interactive elements 152, for example, only allowing the user to adjust the position of the interactive elements 152 between specific areas or regions of the document. As another example, the appearance of the interactive element 152 may be governed by an overall skin or style template of the initial document 150 itself. As noted above, this may allow the document creation platform 180 to ensure that the initial document 150 (and enhanced document 151, when exported), including interactive elements 152, have a uniform appearance. In some embodiments, the user 101 may be able to select or choose interactive elements 152 to be made available to the reviewer 103 (e.g., through the document interaction platform 171 or document review portal 145) but not included as a visible element in the document itself. In other embodiments, the user 101 may be able to designate certain interactive elements 152 to be excluded when printing the document.

As an illustrative example, the enhanced document creation system 110 may host a resume creation platform (a la www.myperfectresume.com or www.zety.com) that users 101 may use to create, view, update, and export resumes having interactive elements. The resume creation platform, for example, may allow the user 101 to add or provide one or more of the following interactive elements 152 that a reviewer 103 of the resume may select or click to take action:

- a "My Personal Website" interactive element, which may re-direct the reviewer 103 to a personal career website of the user 101. When adding the interactive element, the user 101 may have been prompted for a link to their personal website through the document interaction platform 171;
- a "Video About Me" or "Video Resume" interactive element, which may re-direct the reviewer 103 to a video resume prepared by the user 101 (e.g., hosted on YouTube, Vimeo, or other video hosting service, the user's personal website, or the document interaction platform 171 of the user-reviewer interface system 170). When adding the interactive element, the user 101 may have been prompted for a link to the external website hosting the video, prompted to upload their video resume to the user-reviewer interface system 170, and/or prompted to create their video resume through the document interaction platform 171;
- a "Public Testimonials" or "Google Me" interactive element, which may re-direct the reviewer 103 to preferred and/or filtered search results regarding the user 101 (e.g., via Google, LinkedIn, or other search engine or service). When adding the interactive element, the user 101 may have been prompted for a link to the search results or may have been guided through a process of creating preferred and/or filtered search results to be linked to through the document interaction platform 171;
- a "LinkedIn Profile" or "Facebook Profile" interactive element, which may re-direct the reviewer 103 to the user's social media profile (e.g., on LinkedIn or Facebook). When adding the interactive element, the user 101 may have been prompted for a link to their profile and/or may guide the user 101 through the process of establishing and authorizing a relationship between the social media platform and, for example, the user-reviewer interface system 170;
- "Online Resume" interactive element, which may present the reviewer 103 with an up-to-date version of the user's resume hosted online at a specific website (e.g., a permalink), which may be provided by the enhanced document creation system 110 and/or presented to the reviewer 103 through the document interaction platform 170. Preferably, the online resume can be synchronized with the enhanced document 151 such that when changes are made to the enhanced document 151, the updates are pushed to the online resume automatically or upon approval by user 101. The online resume may be initially created from the enhanced document by enhanced document creation system 110;
- a "Work Portfolio" interactive element, which may allow the reviewer 103 to view a portfolio of the user's work (e.g., an artistic portfolio, articles that the user has written or has had published, or the like) and may re-direct the reviewer 103 to an external website or the document interaction platform 171 itself where the user 101 may have their work hosted. The work portfolio interactive element may link the user to a related section of the online resume. When adding the interactive element, the user 101 may be prompted to provide a link to the external website or upload their work to the user-reviewer interface system 170 itself;
- a "Complete List of Skills" interactive element, which may present the reviewer 103 with a complete list of skills believed to be relevant to the role toward which the resume is directed (e.g., via the document interaction platform 171), which the user 101 may not have been able to include in the resume itself (e.g., due to space limitations). The complete list of skills interactive element may link the user to a related section of the online resume. When adding the interactive element, the user 101 may be prompted to enter the complete list of skills through the document interaction platform 171;
- a "Current Licenses/Certificate" interactive element, which may present the reviewer 103 with a list of the certifications (e.g., nursing certifications), licenses (e.g., license to practice law), and/or accreditations obtained by the user 101 (e.g., as images displayed via the document interaction platform 170). In some cases, the interactive element will trigger a notification to the user 101 indicating that the reviewer 103 has requested to see their licenses, certifications, and accreditations, and optionally may request their approval or authorization before disclosing them to the reviewer 103. The current licenses/certificate interactive element may link the user to a related section of the online resume. The reviewer 103 may also be presented with proof that the licenses, certifications, and accreditations are current, up to date, and active (e.g., by re-directing the reviewer 103 to an external website of the entity that manages the certification, license, or accreditation);
- a "Student Transcripts" interactive element, which may present the reviewer 103 with the most recent transcripts of the user 101. The student transcripts interactive element may link the user to a related section of the online resume. When adding the interactive element, the user 101 may be prompted to upload copies of their transcripts or link to or otherwise establish a relationship with the associated educational institution, which may directly provide the reviewer 103 with official transcripts;
- a "List of Hobbies" interactive element, which may present the reviewer 103 with a list of hobbies of the user 101 (e.g., via the document interaction platform 171), which the user 101 may not have thought necessary to include in the resume itself. The list of hobbies interactive element may link the user to a related section of the online resume. When adding the interactive element, the user 101 may be prompted to enter a list of their hobbies or select one or more hobbies from a list through the document interaction platform 171;
- a "Willing to Travel" interactive element, which may indicate to the reviewer 103 a user's availability and desire to travel. The willing to travel interactive element may link the user to a related section of the online resume. When adding the interactive element, the user 101 may be prompted to provide this information through the document interaction platform 171;
- a "Car Access" interactive element, which may let the reviewer 103 know whether the user 101 has access to a car, a valid driver's license, and/or car insurance. The car access interactive element may link the user to a related section of the online resume. When adding the interactive element, the user 101 may be prompted to provide this information, for example, through the document interaction platform 171 (e.g., by entering their license information and uploading proof of insurance) and/or by linking to an external website (e.g., a website of the user's insurance provider, or a license verification service at the DMV);

a "Work Eligibility" interactive element, which may indicate to the reviewer 103 whether the user 101 is authorized to work in a particular country. The work eligibility interactive element may link the user to a related section of the online resume. When adding the interactive element, the user 101 may be prompted to identify the country or countries in which they are authorized to work through the document interaction platform 171. In other cases, the user-reviewer interface system 170 may automatically retrieve this information from a user profile maintained at the enhanced document creation system 110;

a "Request References" interactive element, which may provide the reviewer 103 with a list of references provided by the user 101, and allow the reviewer 103 to contact them, for example, directly through the document interaction platform 171. In some cases, the interactive element may trigger a notification to the user 101 indicating that the reviewer 103 has requested to see their references, and optionally may request their approval or authorization before disclosing the references to the reviewer 103. When adding the interactive element, the user 101 may be prompted to identify their references and indicate whether an authorization request would be desired through the document interaction platform 171;

a "Verified Resume" or "Verified Details" interactive element, which may indicate to the reviewer 103 whether the information in the enhanced resume has been verified and is accurate (e.g., by the enhanced document creation system 110). For example, the reviewer 103 may be provided with an indication that the academic credentials (e.g., transcripts, degrees or diplomas, test scores, etc.), technical certifications, work experience, or skills listed by the user in the resume have been verified, and in some cases, may be provided with proof of such verification.

a "Background Check" interactive element, which may allow the reviewer 103 to request and/or view the results of a background check run on the user 101. When adding the interactive element, the user 101 may be prompted to provide authorization (e.g., as required by state or federal laws) to run the background check and/or release the results to the reviewer 103 through the document interaction platform 171;

an "Estimated Commute" interactive element, which would provide the reviewer 103 with the estimated commute time that the user 101 would face, while also protecting the user's privacy since the user 101 need not disclose where they live and/or would be commuting from. When adding the interactive element, the user 101 may be prompted to enter the address from which they would be commuting through the document interaction platform 171. While in other cases, the user-reviewer interface system 170 may pull this information automatically from the enhanced document creation system 110 (e.g., from a user profile maintained there);

"Salary Requirements" interactive element, which may provide the reviewer 103 with any salary requirements specified by the user 101 and/or present the reviewer 103 with a salary negotiation tool, through which the reviewer 103 and user 101 may be able to negotiate a mutually agreeable salary and/or benefits package. The salary interactive element may link the user to a related section of the online resume. When adding the interactive element, the user 101 may be prompted to indicate their desired and/or minimum salary through the document interaction platform 171;

an "Hours Available" interactive element, which may provide the reviewer 103 with a calendar indicating what days and time periods or shifts the user 101 can fill. The hours available interactive element may link the user to a related section of the online resume. When adding the interactive element, the user 101 may be prompted to fill out a schedule (e.g., allowing the user 101 to specify their availability for a morning, daytime, evening, and nighttime shift for each day of the week) or guided through a process for importing or linking to an existing calendar (e.g., through public facing Google Calendar, Microsoft Outlook, or Apple iCal APIs) through the document interaction platform 171;

a "Send Message" interactive element, which may allow the reviewer 103 to send the user 101 a text message, e-mail, or other notification, or allow the reviewer 103 to otherwise contact the user 101 (e.g., by initiating a VoIP phone call), directly through the document interaction platform 170, which may help to maintain the privacy of the user 101. When adding the interactive element, the user 101 may be prompted for their contact information and preferred manner of contact through the document interaction platform 171. In some cases, the interactive element may refer to a specific mode of communication (e.g., through a "Text Me" or "WhatsApp Me" interactive element), while in other cases the interactive element may refer to the method of contact the user is likely to respond to the fastest (e.g., through a "Contact Me Quickly" interactive element);

a "Received"\"Under Review" interactive element, which may allow the reviewer 103 to quickly send a notification to the user 101 letting them know their resume was received and/or is under review, and optionally letting them know when they may receive a follow-up communication;

an "Interested"\"Not Interested" interactive element, which may allow the reviewer 103 to easily send a notification to the user 101 indicating a decision the reviewer 103 reached regarding the user's resume; and a "Schedule Interview" interactive element, which may allow the reviewer 103 to view the availability of the user 101 for conducting an interview (e.g., presenting the reviewer 103 with a calendar) and may allow the reviewer 103 to schedule the interview (e.g., by sending the user 101 a Google or Outlook calendar invitation). In some cases, the interactive element may trigger a notification to the user 101 indicating that the reviewer 103 has requested an interview, and optionally may request the user 101 confirm their availability or propose a more suitable time to the reviewer 103. When adding the interactive element, the user 101, through the document interaction platform 171, may be prompted to provide information regarding their availability, for example, soliciting specific dates and times as to their availability, asking the user to submit a link to an electronic calendar of the user 101, or guide the user 101 through the process of establishing and authorizing a relationship with a calendar service calendar (e.g., through public facing Google Calendar, Microsoft Outlook, or Apple iCal APIs).

The foregoing examples are illustrative in nature and are not intended to limit the present invention, and one skilled in the art would appreciate that a number of other interactive elements, which may provide additional or alternative functionality, could be provided without deviating from the scope of the invention.

The document creation platform 180 may allow the user 101 to save the initial document 150 in a particular state, which the user 101 can later restore to view and/or further modify. The user 101 may also choose to download or export the initial document 150 in a particular file format. In response to the user request, the enhanced document creation system 110 may ask the user 101 to confirm that the initial document 150 and interactive elements 152 are finalized. If not, the user 101 may be able to review and update their appearance, to the extent permitted by the document creation platform 180, along with any underlying information provided by the user 101 (e.g., providing updated availability for a meeting) or select one or more additional interactive elements 152 to add or choose to make available if so desired. Once finalized, the enhanced document creation system 110 may render the initial document 150 in a particular file format (e.g., in Microsoft Word's DOCX format or Adobe Acrobat's PDF format) and export it as enhanced document 151.

Traditional file formats, like Microsoft Word's DOCX format or Adobe Acrobat's PDF format, while allowing for documents to be rendered in a manner that is visually appealing to a human reader, typically store information in an unstructured manner making it difficult for automated parsing software (or parsers) to interpret the electronic document accurately, resulting in misread, miscategorized, or discarded information and preventing or complicating further processing of the document. By way of example, a job seeker will typically prepare a precisely formatted resume (e.g., as a DOCX or PDF file) that they may upload in the process of submitting an online job application. But an applicant tracking system (ATS) or other document review system, and/or the resume parsing system on which it may rely, may encounter difficulties when attempting to parse the resume to extract information therefrom. As a result, the resume may never make it to a human reviewer or the human reviewer may be presented with incorrect or incomplete information about the job seeker.

Accordingly, in some embodiments, the enhanced document creation system 110 may take additional steps to ensure that the enhanced document 151 can be completely and accurately parsed, for example, by employing the techniques described in co-pending U.S. patent application Ser. No. 17/207,304, entitled SYSTEMS AND METHODS FOR CREATING ENHANCED DOCUMENTS FOR PERFECT AUTOMATED PARSING, which is incorporated by reference herein in its entirety. The enhanced document creation system 110, for example, may encode the content of initial document 150 (including any interactive elements 152) in accordance with a defined schema, and embed the resulting structured data as non-visible metadata in the rendered document. The resulting enhanced document 151 can be completely and accurately parsed by a document parsing system 130 capable of extracting and decoding the metadata embedded therein. Alternatively, the enhanced document creation system 110 may store the encoded document content in association with a document identifier (e.g., in document database 216), which may instead be embedded as non-visible metadata in the document. In such cases, the document parsing system 130 may extract the embedded document identifier, request the encoded content associated therewith from the enhanced document creation system 110, and decode the structured data received from the enhanced document creation system 110 to perfectly parse the enhanced document 151. Furthermore, as discussed in U.S. patent application Ser. No. 17/207,304, the perfect parsing functionality need not be performed by a standalone document parsing system 130, and can naturally be extended for use directly by a document submission system 160 (e.g., through a widget, embedded library, or the like). Similarly, the perfect parsing functionality can be extended for use directly at a document review system 140 (e.g., an ATS or other resume review system).

After exporting and downloading the enhanced document 151, user 101 may submit the enhanced document 151 to a document submission system 160 for processing, for example, through a document submission platform 190 that users 101 may interface with over the Internet 105 (e.g., using a web browser on user device 102). By way of example, document submission system 160 may host a job application board, which may provide the user 101 with the ability to search through job postings and submit an application for a job by uploading a resume and other application materials (e.g., cover letter, references, etc.).

The document submission system 160 may forward or otherwise provide the enhanced document 151 to the reviewer 103 (e.g., via e-mail viewable through reviewer device 104) as a stand-alone document. Upon downloading and opening the enhanced document 151, the reviewer 103 may be able to click or otherwise select an interactive element 152 to take or initiate the action associated therewith. Selecting the interactive element 152 may direct the reviewer 103 to the user-reviewer interface system 170, which may automatically trigger the execution of logic associated with the interactive element 152 that was selected. The user-reviewer system 170, for example, may re-direct the reviewer 103 to an external website, prompt the reviewer 103 to enter additional information needed in order to execute the associated logic, and/or call or otherwise trigger a function or service (e.g., by calling a public facing service of the enhanced document creation system 110, document submission system 160, document review system 140, document parsing system 130, and/or a third-party system). Where additional information is required, the reviewer 103 may be directed to the document interaction platform 171 and funneled through a series of prompts to solicit the necessary information, after which the action may be taken. In some embodiments, the user-reviewer interface system 170 may allow the reviewer 103 to create an account, or log into an existing account, with the system.

By directing the reviewer 103 to the user-reviewer interface system 170, the user-reviewer interface system 170 is able to track reviewer interaction with the enhanced document 151, and may notify the user 101 regarding the same. The user 101, for example, may be sent a notification with details regarding the reviewer's action (e.g., via an SMS message, e-mail message, notification via a mobile application, or notification via a user dashboard provided through document interaction platform 171). For example, in the job application context, a user 101 may be applying to several jobs and may be able to track the status of each application they submitted through a job search organizer or similar dashboard. In such cases, the user-reviewer interface system 170 may track the identity of the reviewer 103 (e.g., based on an IP address of the inbound request and/or a browser fingerprinting techniques, or based on login credentials provided by the reviewer 103), such that the user-reviewer interface system 170 is able to disambiguate between multiple reviewers 103 interacting with the same document.

In some instances, the user-reviewer interface system 170 may be able to detect when the reviewer 103 opens the enhanced document 151 itself, and may similarly notify the user 101 of the same. The interactive element 152 within the enhanced document 151, for example, may have an image uniquely associated therewith (i.e., serving as a unique element identifier), which may be hosted by the user-reviewer interface system 170. When the reviewer 103 opens the enhanced document 151 (e.g., in a word processing application), the image may be automatically retrieved (e.g., in order to visually render the document), thereby alerting the user-reviewer interface system 170 that the enhanced document 151 has been viewed. In some cases, the images may be hidden or otherwise obfuscated from view (e.g., being represented as a single-pixel, and/or having a transparent or low-contrast color), such that the reviewer 103 is unaware of the monitoring that is taking place.

In some embodiments, the interactive element 152 provided within the enhanced document 151 may be dynamic in nature. For example, as noted above, the interactive element 152 may be associated with a unique image hosted by the user-reviewer interface system 170, which may be requested from the user-reviewer system 170 (e.g., via a URL directed to an image or a script that returns image content). When the user-reviewer system 170 receives a request for the image, it may execute certain logic before ultimately returning the requested image. By way of example, an enhanced resume document may include an interactive element that provides a reviewer 103 with an updated version of the resume if one is available, where the interactive element takes the form of an image hosted by the user-reviewer system 170. When the interactive element is rendered a request for the associated image may be sent to the user-reviewer system 170, which in turn, may determine when the particular image was last requested and whether the enhanced resume had since been updated by the reviewer. In some cases, the user-reviewer system 170 may return an image reflective of this determination (e.g., an "Updated Resume Available" image or a "Resume is Up to Date" image). As another example, the enhanced resume may include an interactive element that allows the reviewer 103 to contact the user 101. When the image associated with the interactive element is requested from the user-reviewer system 170, it may determine the communication preferences of the user 101 and return an image corresponding to the preferred method of contact (e.g., "E-mail Me," "Text Me," "Call Me," or the like). In this way, the interactive element 152 itself can serve as a notification to the reviewer 103.

As noted above, the user 101 may be notified when a reviewer 103 opens or otherwise interacts with an enhanced document 151. The notification provided to the user 101 may also indicate whether additional action by the user 101 is required, and if so, may direct the user 101 to the document interaction platform 171, which may automatically trigger the execution of logic associated with the additional action. The user 101, for example, may be funneled through a series of prompts whereby the user 101 may provide the necessary information and/or input. The reviewer 103 may similarly be provided a notification with details of the user's action and whether further action by the reviewer 103 is required, and if so, may direct the reviewer 103 to the document interaction platform 171 to provide the requisite information and/or input. In this way, the user-reviewer interface system 170 is able to facilitate a back-and-forth exchange between the user 101 and reviewer 103.

By way of example, a recruiter may select a "Request References" interactive element in an enhanced resume. But before this information is released to the recruiter the job applicant must provide authorization. The recruiter may be prompted to enter identification information before sending the request to the job applicant. The job applicant, in turn, may be sent a notification indicating that a recruiter has viewed their resume and requested access to their references, and may prompt the job applicant to authorize or deny the request. Based on the applicant's selection, an appropriate notification may be sent to the recruiter. In doing so, the user-reviewer interface system 170 may maintain a state of communications between the user 101 and particular reviewer 103 (e.g., based on an IP address and/or browser fingerprint of the particular reviewer 103, or based on login credentials provided by the reviewer 103) with respect to a particular interactive element 152 and enhanced document 151, permitting multi-session user-reviewer engagement. The user-reviewer interface system 170 may also maintain a communication state for a user 101 and/or reviewer 103 individually, allowing for multi-session interactions more generally.

As noted above, the document submission system 160 may also pass the enhanced document 151 along to the document review system 140, which may automatically process the enhanced document 151 and present it to reviewer 103 through a document review portal 145 that reviewers 103 may interface with over the Internet 105 (e.g., using a web browser on reviewer device 104). In the job application context, for example, an ATS or other resume review system, may provide an application review portal through which a recruiter or HR employee may review job applications and resumes submitted by users 101 through the job application board. A number of commercial ATS solutions are available for such purposes, including offerings from Workday, Greenhouse, and other popular vendors.

The document review system 140 may process the documents in order to facilitate review of the documents and submissions by reviewer 103 through the document review portal 145. The document review system 140, for example, may automatically parse the enhanced document 151 to extract significant information therefrom, and may utilize document parsing system 130 in order to do so. The document review system 140 may use the extracted information to provide different functionality to the reviewer 103 through the document review portal 145, for example, allowing the reviewer 103 to search, or otherwise filter, the user submissions based on the extracted information.

Document review systems 140 also commonly provide a "preview" of the uploaded document within the document review portal 145 (e.g., in an HTML format), such that reviewer 103 does not need to download and open the document (i.e., as a stand-alone document). The user-reviewer interface system 170 may nevertheless be able to track the reviewer's interaction with the enhanced document 151 through the document review portal 145 (e.g., through the presence of a unique image, as discussed above, that is rendered in the "preview"). Furthermore, in cases where a reviewer 103 is relying on a preview of the enhanced document 151 provided through the document review portal 145, the previously described functionality of the user-reviewer interface system 170 and document interaction platform 171 may be provided within the document "preview" presented to the reviewer 103 in the document review portal 145 itself. The reviewer 103, for example, may be re-directed to an external website or prompted for additional information within the document review portal 145 itself.

In some cases, the document review system 140 may have an arrangement or relationship with the enhanced document creation system 110 and/or user-reviewer interface system 170, which may allow the document review system 140 to take further action when presenting the "preview" through the document review portal 145. The document review system 140, for example, may alter the "preview" based on the interactive elements 152 contained within an enhanced document 151. For instance, as discussed above, interactive elements 152 may be dynamic in nature and the document review system 140 may adjust the "preview" based on the information conveyed by the interactive element. By way of example, where an interactive element 152 indicates that an updated version of the enhanced document 151 is available, the document review system 140 may automatically retrieve the updated document (e.g., from enhanced document creation system 110) and present the updated document in the "preview."

Furthermore, while the document review system 140 may generate the document "preview" itself, in some cases, it may instead rely upon a document "preview" returned by the document parsing system 130 upon parsing of the enhanced document 151. Accordingly, in instances where document parsing system 130 is able to perfectly parse the enhanced document 151 by extracting an embedded document identifier and obtaining encoded content associated therewith from enhanced document creation system 110, better control over the document "preview" is possible and improved functionality may be provided. For instance, in rendering the document "preview" by the document review system 140, the appearance and functionality of the interactive elements 152 may become malformed (e.g., preventing the selection of the interactive elements 152, or eliminating them from the document "preview" altogether). The enhanced document creation system 110, however, may be able to ensure that the encoded content that is returned to the document review system 140 is appropriately formatted such that interactive elements 152 are properly rendered for display in the document review portal 145. As another example, the enhanced document 151 may become a living document, with the enhanced document creation system 110 being able to return an updated version of the enhanced document 151 which may contain additional or more accurate information.

The enhanced document creation system 110 may also be able to dynamically assign or update a hyperlink or URL associated with a particular interactive element 152, such that it can be uniquely associated with a particular document submission. For example, in the job application context, the resume creation platform, when returning encoded resume content, may dynamically assign unique hyperlinks for each interactive element in the enhanced resume, such that they may be associated with a particular job application for which the enhanced resume was submitted and/or ATS in which the enhanced resume is being reviewed. In this way, the user-reviewer interface system 170 may be able to uniquely track interaction with the enhanced resume 151 with respect to each of the many particular job applications a user 101 may have submitted.

The enhanced document creation system 110 may also dynamically assign or updated a hyperlink or URL associated with different sections of the online resume, particularly those that are linked by interactive elements 152. The user can then view aggregated statistics related to each URL. For example, an enhanced document 151 may comprise a plurality of interactive elements 152, with each being associated with a unique URL. Because each URL is unique, the user 101 can view analytics related to each employer such as number of views, dates accessed, number of interactive elements clicked, etc. for each enhanced document 151, online resume, or interactive elements 152.

In some instances, the document review portal 145 may itself seek to provide similar functionality to those provided by the interactive elements 152 of the enhanced document 151 (e.g., providing a "Schedule an Appointment" feature), but would not otherwise have the benefit of any underlying information provided by the user 101 when adding the interactive element 152. In such cases, the document review portal 145 may be able to interface directly with the user-reviewer interface system 170 (e.g., through a plug-in or extension installed at the document review system 140), with the document interaction platform 171 serving to replace or complement the document review portal 145 interface. By way of example, when a reviewer 103 selects a "Schedule an Interview" within an ATS, a request may be sent to the user-reviewer interface system 170 requesting information regarding the user's availability for an interview (e.g., to a public facing service of the user-reviewer interface system 170). The user-reviewer interface system 170 may retrieve information regarding the user's availability (e.g., from the user-reviewer data database 217 of the enhanced document creation system 110), and return this to the ATS, which may then open the reviewer's calendar and display user's schedule. An even tighter integration (e.g., through a plug-in or extension installed at the document review system 140), may allow interactive elements 152 to be presented directly within the document review portal 145, regardless of whether the document review portal 145 provides a similar feature.

Further still, as noted above, the user 101 may be able to select or add interactive elements 152 to be made available to the reviewer 103 but would not be included as visible elements within the enhanced document 151 itself. The document review system 140, for example, may be able to request a list of all available interactive elements 152 associated with an enhanced document 151 that has been submitted from the enhanced document creation system 110 (e.g., by invoking a public facing API and passing the exported document identifier embedded within the enhanced document 151). The document review system 140 can make all of the returned interactive elements 152 available to the reviewer 103, for example, as part of the document "preview" and/or directly within the document review portal 145 (e.g., through a plug-in or extension installed at the document review system 140).

As noted above, the document review system 140 may have an arrangement or relationship with the enhanced document creation system 110 and/or user-reviewer interface system 170, which may also allow for improved interaction between the user 101 and reviewer 103. The enhanced document creation system 110 and/or user-reviewer interface system 170, for example, may provide a public facing service through which the document review system 140 may automatically receive, or selectively retrieve, status notifications. The statuses may be generic status updates for the user 101, status updates with respect to a particular initial document 150 or enhanced document 151, or a particular document submission, and may be provided by the user 101, or the enhanced document creation system 110 and/or user-reviewer interface system 170. For example, in the job application context, the status notification could indicate that an updated resume is available, that the contact information, availability (e.g., number of hours or shifts), or salary requirements for the user 101 has been updated, that new certifications have been added, transcripts are available, or that new references are available, that a background check has been completed, or the like. The user 101 may be able to modify and/or delete statuses. In some cases, the ability to modify statuses may only be possible where the status notification has not been delivered to or read by the document review system 140.

The enhanced document creation system 110 and/or user-reviewer interface system 170, for example, may provide SubscribeClient and CheckSubmissionStatus methods to the document review system 140. The SubscribeClient function may allow the document review system 140 to subscribe to receive or request status notifications or messages tailored by the user 101 for a particular submission of an enhanced document 151 (e.g., the submission of a particular enhanced resume for a specific job opening). As part of the subscribe request, the document review system 140 may provide an enhanced document identifier, identifying the enhanced document 151 for which the system is subscribing, and a submission description to identify the document review system 140 and the context of the document submission. For example, in the job application context, the submission description may contain an employer name, job title, and an application date. The submission description may also contain a unique job identifier and user identifier (i.e., unique to the document review system 140), as well as a job posting date, hiring department, location, recruiter and manager. By way of example: "JobApplication": {{"jobRequisitionKey": "45F8L250YH", "employerName": "Acme Corporation Inc.", "jobTitle": "Pyrotechnics Engineer", "applicationDate": "2021-3-20", "applicantKey": "148219671", "openDate": "2021-3-13", "department": "Engineering", "location": "Phoenix, AZ", "recruiter": "Human Resources", "hiringManager": "W. E. Coyote"}}. In response to a valid subscribe request, the enhanced document creation system 110 and/or user-reviewer interface system 170 may return a unique document submission identifier (i.e., unique within the enhanced document creation system 110 and/or user-reviewer interface system 170), which the document review system 140 may then use to check status information provided by the user 101 with respect to that submission.

The subscribe request may also indicate whether the document review system 140 would like to actively receive notifications or whether it would prefer to selectively retrieve the notifications. In the case of the active notifications, the document review system 140 may additionally provide a notification URL as part of the subscribe request, to which the enhanced document creation system 110 and/or user-reviewer interface system 170 will "push" notifications as and when they occur (e.g., when an applicant sets their status or some other information becomes available to the document review system 140). A push notification message may include the document submission identifier and user identifier, as well as a notification identifier, a notification type, and the substance of the notification. In some cases, the status notification may also include a hyperlink (e.g., to the user-reviewer interface system 170) through which a reviewer 103 may take action. By way of example: "DocumentSubmissionNotification": {{"notificationID": "c544f1b8", "document submission ID": "025f7f8b", "user ID": "148219671", "notificationType": "Status Update", "statusText": "Student transcripts now available.", "calltoActionText": "View Transcripts", "calltoActionURL": "https://cv.userreviewerinterface. com/025f7f8b?transcript", "Timestamp": "2021-3-21 19:04:24"},}.

The CheckSubmissionStatus method, likewise, may be used by the document review system 140 to determine a status set by the user 101 with respect to a particular document submission, which may be identified as part of the method request (e.g., by passing a document submission identifier). In response to a CheckSubmissionStatus request, the enhanced document creation system 110 and/or user-reviewer interface system 170 may return the latest status set by the user 101 or the last n number of statuses set by the user 101 for an associated document submission, which may be specified as part of the request.

In some embodiments, the enhanced document creation system 110 and/or user-reviewer interface system 170 may track the read or unread status associated with a request. In such cases, the enhanced document creation system 110 and/or user-reviewer interface system 170 may return the number of unread statuses and/or only return unread statuses in response to a CheckSubmissionStatus request. By way of example: "submissionStatuses": "totalRecordsAvailable": "5", "unreadRecordsAvailable": "0", "numRecordsReturned": "2", {"notificationID": "fc8d61e8-2df1-4881-a53f-ca5509db77a0", "statusText": "Seeking full-time employment", "Timestamp": "2021-3-13 08:21:55"}, "notificationID": "f3be5851-492a-4852-98a7-ad7f5b6b32b7", "statusText": "I've been hired. No longer on the market.", "Timestamp": "2021-3-21 19:04:24"}}.

In some cases, the CheckSubmissionStatus method may allow the document review system 140 to specify that previously unread statuses should be marked as read by the enhanced document creation system 110 and/or user-reviewer interface system 170. Alternatively, or additionally, the enhanced document creation system 110 and/or user-reviewer interface system 170 may provide a MarkNotificationRead method to mark a particular notification being read, for example, based on a notification identifier submitted with the method request.

In some embodiments, it may only be necessary or desirable to receive status notifications with respect to a particular enhanced document 151. In such cases, the CheckSubmissionStatus method may be replaced with a CheckDocumentStatus method, which may only return information and statuses at a global or document level.

A person of skill in the art would also appreciate that the described services could be extended to support the methods of integration discussed previously. For example, as discussed above, the document review system 140 may be able to request a list of all available interactive elements 152 associated with a particular submission of an enhanced document 151.

FIG. 2 provides a more detailed view of the enhanced document creation system 110, document submission system 160, document review system 140, document parsing system 130, user-reviewer interface system 170 and their constituent components.

As illustrated, the enhanced document creation system 110 may include one or more communication interfaces 211 (e.g., a WiFi communication interface or a LAN interface), one or more processors 212, a memory 213, a storage device 214, which may contain document skin library 214a, and one or more databases, including user-reviewer data database 217, document database 216, element definition database 215, and user database 218. The memory 213 may include document creation platform logic 220, element service logic 224, encoding logic 221, desensitization logic 222, rendering logic 223, and embedding logic 225, which processor(s) 212 may utilize to provide the system functionality discussed above and described in further detail below.

Document creation platform logic 220, for example, may allow the enhanced document creation system 110 to provide a document creation platform 180 through which a user 101 may create an initial document 150. The enhanced document creation system 110, for example, may utilize document creation platform logic 220 to present a website to the user 101 with fillable form elements or fields that a user 101 may fill out, select, or otherwise complete.

For example, document creation platform logic 220 may present the user with a resume building tool, which may prompt a user to select a resume template, or may select a resume template automatically based on one or more attributes of the user 101, which may be stored in user database 218 (e.g., as part of a user profile). Based on the selected template, the document creation platform logic 220 may then generate a resume form, with one or more empty sections having one or more fields or other form elements for the user 101 to complete. The sections, for example, may be directed toward the user's personal identification information, educational background, job experience, or the like. As another example, the document creation platform 180 may present the user 101 with a list of sections that a user 101 may select to include in the initial document 150. In some instances, the resume form may be dynamic in nature, for example, allowing a user to add or remove sections (e.g., for each college or university attended, or each job they have held). Through the document creation platform 180, user 101 may choose a section or paragraph to edit, and may be presented with a text entry form for that section or paragraph. User 101 may then modify the text and adjust formatting inputs (e.g., positioning, style, etc.) for the section. Alternatively, in some cases, the document creation platform 180 may limit the user's ability to adjust formatting, (e.g., relying on a document skin instead), so as to maintain a uniform appearance of the document (including any interactive elements 152)

The document creation platform 180 may additionally (or alternatively) allow the user 101 to provide an existing un-enhanced document, which the enhanced document creation system 110 may parse using parsing software. The information extracted by parsing the document may be analyzed by document creation platform logic 120 to identify the presence of one or more sections, and to seed or pre-populate the fillable form elements of the initial document 150 corresponding to the identified sections (or create a new pre-populated initial document 150 having the identified sections). User 101 may then be able to edit the document content, for example, to correct any errors or omissions resulting from the automated parsing of an un-enhanced document.

The document creation platform 180 may also allow the user 101 to add or include one or more interactive elements 152. Document creation platform logic 220, for example, may allow the user to add an interactive element section to the initial document 150 and may present the user 101 with a set of available interactive elements 152 to choose to include in the section. The user 101 may then choose one or more interactive elements 152 to add to the initial document 150. In doing so, user 101 may be directed to a document interaction platform 171 hosted by the user-reviewer interface system 170, which, in turn, may trigger the execution of logic associated with the interactive element 152 that was selected. The user-reviewer interface system 170, for example, may prompt the user 101 to enter information needed to execute the associated logic.

In some embodiments, the document creation platform 180 may allow the user 101 to designate whether interactive elements 152, individually or collectively, should appear when the enhanced interactive document 151 is physically printed. In other embodiments, the user 101 may be able to select interactive elements 152 that they wish to be optionally available to a reviewer 103. These interactive elements 152 may be included as encoded document content (e.g., to be embedded as non-visible metadata within an enhanced document 151, or returned by the enhanced document creation system 110 in response to a request for the encoded content associated with an exported document identifier embedded in an enhanced document 151), but may not be visible within the document. Alternatively, the interactive elements 152 may be included in the visible portion of the document but may nevertheless be hidden or obfuscated from identification and inspection by a human reviewer (e.g., being represented by a single-pixel image, and/or transparent or low-contrast color).

In some embodiments, the document creation platform 180 may provide the user with the ability to save the initial document 150 in a particular state in document database 216, and may utilize document encoding logic 221 in order to do so. Document encoding logic 221, for example, may be used to encode the initial document 150 as structured data according to a defined schema (e.g., a proprietary or standardized XML or JSON schema) based on a known semantic meaning of each form element, and by association, the content therein. Document encoding logic 221, for instance, may map each section or paragraph of the resume completed by the user 101 to specific elements and fields within the defined schema. By way of example, a work history section of a resume may contain a record of a user's employment, with a paragraph or sub-section corresponding to each position the user 101 has held. Each position may further contain elements corresponding to the name of the employer, the dates of employment, and description of experience. Based on the semantic meaning of each element (e.g., as falling within a work history section or calling for an employer name) document encoding logic 221 may be able to encode the content entered by the user as structured data according to a structured schema. Document encoding logic 221 notably may encode each interactive element 152 as structured data (e.g., including an "ID," "Label," "URL," as well as optional attributes such as "Available," "Print," or the like).

Document encoding logic 221 may store the encoded document in document database 216. In some embodiments, document encoding logic 221 may encode and store the initial document 150 based on a user input provided through the document creation platform 180 (e.g., by clicking a save interactive element). While in others, document encoding logic 221 may encode and store each form element of the initial document 150 in real-time, as completed by the user (e.g., when a form element goes out of focus). In this way, the document creation platform 180 may maintain a state of the initial document 150, and allow the user 101 to update and revise the document over multiple sessions. The encoded document may be stored in document database 216 in association with a document identifier, which may serve as a version identifier for particular instances of the encoded document.

Document encoding logic 221 may also allow the enhanced document creation system 110 to translate encoded data from one schema to another. Document encoding logic 221, for example, may be able to translate document content encoded according to a proprietary schema used by document creation platform 180 into a standardized schema (e.g., HR-JSON or HR-XML schemas promulgated by the HR Open Standards Consortium) or other schema used by document submission system 160 and/or document parsing system 130.

Desensitization logic 222 may allow the enhanced document creation system 110 to desensitize an encoded document so as to ensure that no sensitive user information (e.g., SSN, photograph, personal identification information, etc.) is included when rendering and exporting the enhanced document 151. The desensitization logic 222, for example, may process an encoded document (i.e., after the initial document 150 has been encoded and stored in document database 216) and mark any sensitive user information to be excluded prior to rendering the encoded document.

Rendering logic 223 may allow the enhanced document creation system 110 to render an encoded (and optionally desensitized or translated) document in a particular file format (e.g., Microsoft Word's DOCX format or Adobe Acrobat's PDF format), which in some embodiments, may be specified by a user 101. The rendering logic 223, for example, may be used to generate an intermediate file from the encoded content, where the visual appearance of the document content (i.e., the positioning and style of the document content) may be provided by a skin definition associated with initial document 150, which may be stored and retrieved from document skin library 214a, and interactive elements 152 may be provided by a skin definition associated with each interactive element 152, which may be stored and retrieved in element skin library 214b. The enhanced document creation system 110, for example, may generate an HTML file comprising different HTML elements, with specified CSS styles, along with a CSS stylesheet (e.g., linked, inline, etc.) to control the position and style (i.e., the visual appearance) of the document content. The enhanced document creation system 110 may then convert the intermediate file into a particular file format, like Microsoft Word's DOCX format or Adobe Acrobat's PDF format. In doing so, the enhanced document creation system 110 may make use of publicly available conversion libraries, like Aspose (for HTML to DOCX conversion) or ABCpdf (for HTML to PDF conversion).

As discussed above, in some embodiments, the enhanced document creation system 110 may seek to ensure that the enhanced document 151 can be completely and accurately parsed, namely by using embedding logic 225 to embed the encoded document content, or an exported document identifier associated with the encoded document content, as non-visible metadata in the rendered document. Some file formats may place limitations on the form in which the non-visible metadata may be written to the converted document, for example, requiring ID-value pairs or limiting the size or length of the value (e.g., to strings of less than 255 characters in length, etc.). Embedding logic 225 may allow the enhanced document creation system 110 to determine the file format of the converted document, and manipulate the byte string so as to conform with any limitations the format may place on non-visible metadata stored therein.

Element service logic 224 may allow the enhanced document creation system 110 to provide an element service to help support the user-reviewer interface system 170 and its document interaction platform 171. Element service logic 224, for example, may provide the logic executed by the user-reviewer interface system 170 for a particular interactive element 152, along with any information necessary for supporting this logic. The enhanced document creation system 110, for example, may maintain an element definition database 215 containing element definitions for each interactive element 152.

The element definition, for example, may define one or more steps or series of steps to be performed in executing a particular interactive element 152, along with the various inputs and parameters needed for each step. By way of example, a Schedule Interview element definition may define an initial set of scheduling parameters to be provided by the user 101, the logic that the document interaction platform 171 may follow to obtain this information from the user 101 (e.g., logic regarding the prompts that are to be presented to the user 101 to solicit the required information), a responsive set of scheduling parameters to be provided by the reviewer 103, the logic that the document interaction platform 171 may follow to obtain this information from the reviewer (e.g., logic regarding the prompts that are to be presented to the reviewer 103 to solicit the required information), and a function or service call to be made once all of the parameters have been obtained (e.g., a Google Calendar API to be called to schedule the appointment for the user 101 and reviewer 103). As the different parameters are obtained through the document interaction platform 171 (e.g., through the prompts presented to user 101 and/or reviewer 103), they may be passed back to the enhanced document creation system 110, where element service logic 224 may operate to store and/or update user-reviewer database 217 accordingly. Element service logic 224, similarly, may provide information and/or parameters stored in user-reviewer database 217 to the user-reviewer interface system 170 as necessary.

The document submission system 160 may include one or more communication interfaces 261 (e.g., a WiFi communication interface or a LAN interface), one or more processors 262, a memory 263, and a storage device 264. The memory 263 may include document submission platform logic 265, which processor(s) 262 may utilize to provide a document submission platform 190 as discussed above.

The document review system 140 may include one or more communication interfaces 241 (e.g., a WiFi communication interface or a LAN interface), one or more processors 262, a memory 243, and a storage device 244. The memory 243 may include document review portal logic 245, which processor(s) 242 may utilize to provide the system functionality discussed above with respect to document review portal 145.

The user-reviewer interface system 170 may include one or more communication interfaces 271 (e.g., a WiFi communication interface or a LAN interface), one or more processors 272, a memory 273, and a storage device 274. The memory 273 may include document interaction portal logic 275, which processor(s) 272 may utilize to provide the system functionality discussed above with respect to the document interaction portal 175.

The document parsing system 130 may include one or more communication interfaces 231 (e.g., a WiFi communication interface or a LAN interface), one or more processors 232, a memory 233, and a storage device 234. The memory 233 may include metadata extraction logic 235 and decoding logic 238, which processor(s) 232 may utilize to provide the system functionality discussed above and described in further detail below.

Metadata extraction logic 235 may allow the document parsing system 130 to extract metadata embedded within an enhanced document 151. The document parsing system 130, for example, may extract the embedded metadata from the enhanced document 151 to obtain a single extracted byte string. Where the metadata consists of a series of ID-value pairs, document parsing system 130 may first concatenate the values in sequence (e.g., based on the IDs) to form the single extracted byte string.

In instances where an exported document identifier was embedded in the enhanced document 151, the metadata extraction logic 235 may contact the enhanced document creation system 110 to request the encoded content (i.e., associated with the exported document identifier) that was initially stored by the document creation system 110 when the document was exported. The document parsing system 130, for example, may be able to query the enhanced document creation system 110 by invoking a public facing API and passing the exported document identifier along with other request parameters. The request, for example, may indicate the desired format in which encoded content should be returned and/or include a license key authorizing the document parsing system 130.

The document parsing system 130 may attempt to extract embedded metadata from a received document automatically, under the assumption that it is an enhanced document 151, or it may first detect whether a received document is an enhanced document 151, for example, based on an indicator (e.g., a keyword or phrase, symbol, graphic, or the like) provided in the visible portion of the document. In some instances, the indicator while appearing in the visible portion of the document may nevertheless be hidden or obfuscated from identification and inspection by a human reviewer (e.g., by using a small font size, and/or transparent or low-contrast color). The document parsing system 130 may also determine whether the extracted byte string represents the encoded content itself or an exported document identifier and may process the extracted metadata accordingly.

Decoding logic 238, in turn, may allow the document parsing system 130 to decode the extracted and optionally decrypted content, and may provide the resulting structured data to document submission system 160 as needed. In some cases, the document parsing system 130 may process the extracted content in order to place it in a form expected by a document submission system 160 (e.g., based on a mapping of some or all of the fields and elements of the defined schema to another schema used by the document submission system 160).

Figure 3:
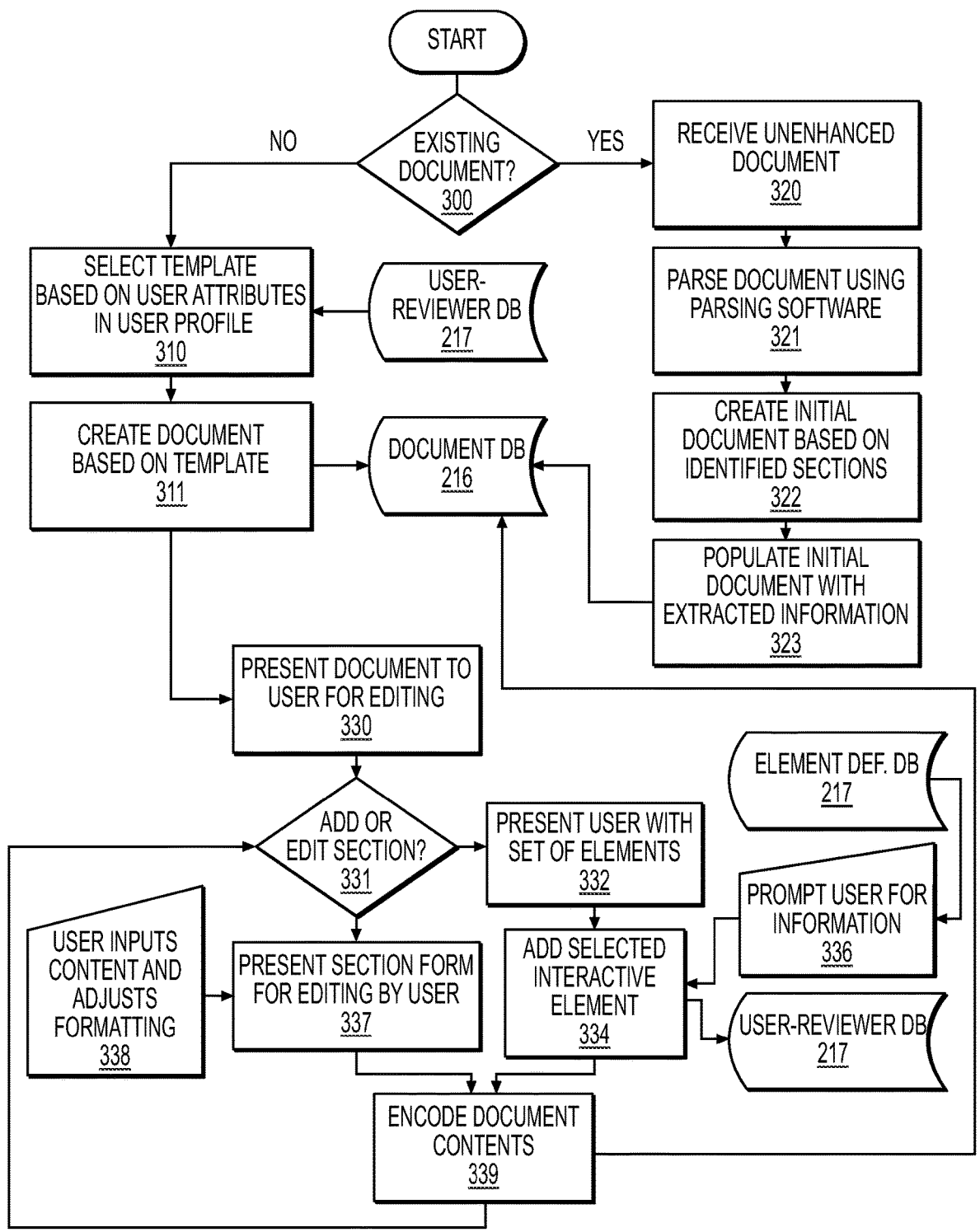
FIG. 3 depicts a high-level logic flow that the enhanced document creation system may employ in creating an interactive document.

FIG. 3 depicts a high-level logic flow that the enhanced document creation system 110 may employ in creating an initial document 150. The process may begin with a determination of whether the user 101 would like to create a new document or work from an existing document, for example, based on a user input provided through a document creation platform 180 (300). If the user 101 decides to create a new document, the enhanced document creation system 110 may select a document template based on one or more user attributes in a user profile associated with the user 101, which may be retrieved from user database 218 (310). The enhanced document creation system 110 may create an initial document 150 in accordance with the selected template, which may be encoded in accordance with a defined schema and stored as a structured document in document database 216 (311).

Alternatively, if the user 101 decides to work from an existing document, the user 101 may upload an unenhanced document through document creation platform 180 (320). The enhanced document creation system 110 may parse the document using document parsing software to extract information from the unenhanced document (321). The enhanced document creation system 110 may analyze the extracted information to determine the presence of one or more sections in the uploaded document, and may create an initial document 150 having equivalent sections (322). The initial document 150 may be encoded in accordance with a defined schema and stored as a structured document in document database 216 in association with a unique document identifier. The enhanced document creation system 110 may also populate the sections within the initial document 150 with information extracted using the parsing software (323). The enhanced document creation system 110 may encode the populated sections according to the defined schema and update the structured document in document database 216 and may assign a new document identifier.

The enhanced document creation system 110 may then present the initial document 150 to the user 101 through document creation platform 180 for the user 101 to view or further modify (330). The user 101, for example, may have the ability to choose to add or edit one or more sections of the initial document 150 (331). If the user elects to add or edit an interactive elements 152 section, the user may be presented with a set of available interactive elements 152 to choose from (332). Based on the user's selection, the document creation platform 180 may add one or more interactive elements 152 to the initial document 150 (334), retrieving corresponding element definitions from element definition database 215 and prompting the user 101 for any underlying information necessary to support the functionality of the interactive elements 152 in the process, which may then be stored in user-reviewer data database 217 (336). Alternatively, if the user 101 chooses a different section (without any interactive elements 152), the enhanced document creation system 110 may present the user 101 with a form corresponding to the section for the user 101 to edit (337). The user 101 may edit the contents and formatting of the section through the form presented to the user 101 (338). Once complete, the enhanced document creation system 110 may encode the section and update the structured document in document database 216 accordingly (339). This process may continue until a determination is made that the user 101 is finished editing the document (331).

Figure 4:
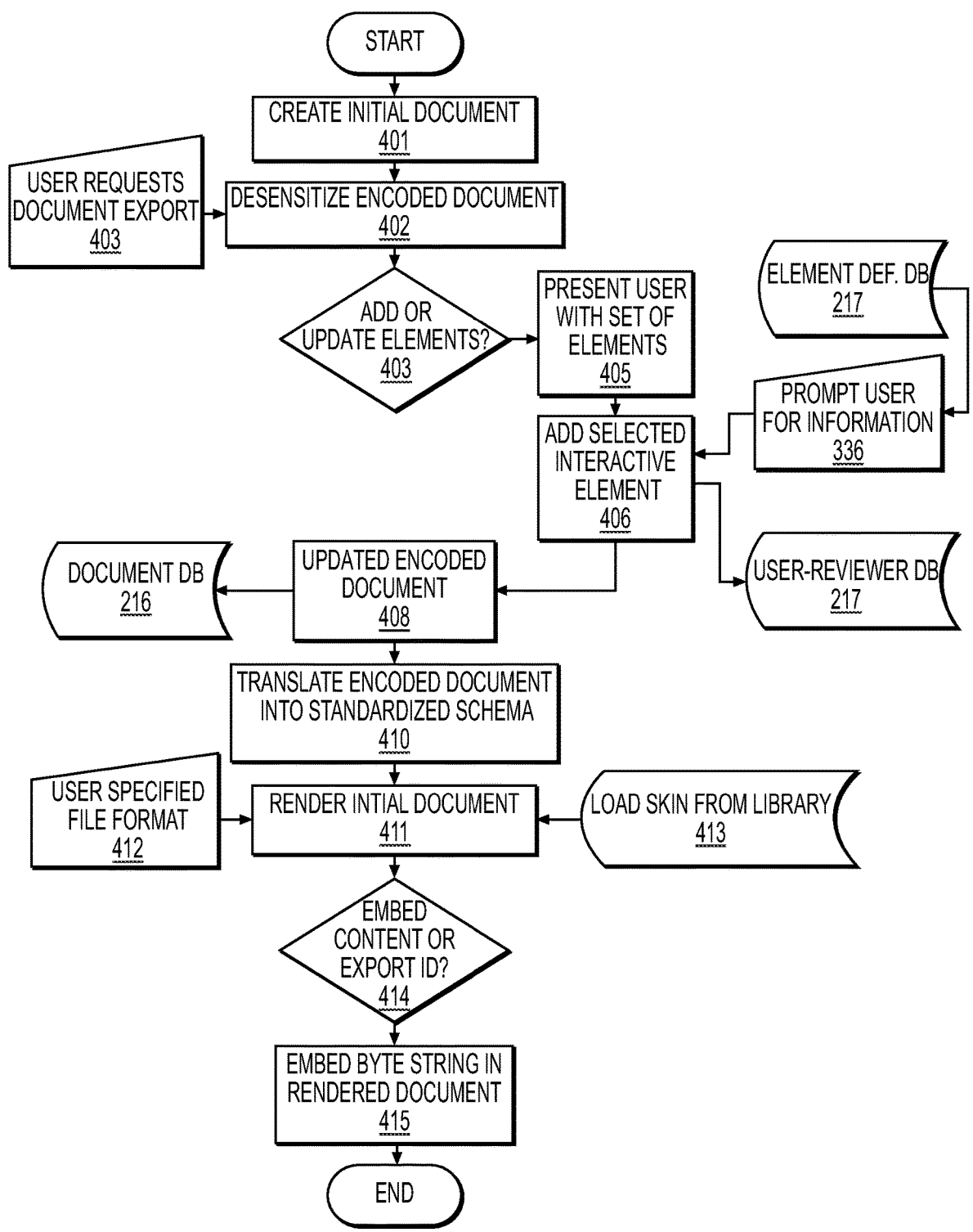
FIG. 4 depicts a high-level logic flow that the enhanced document creation system may employ in exporting an enhanced interactive document.

FIG. 4 depicts a high-level logic flow that the enhanced document creation system 110 may employ in exporting an enhanced document 151. The process may begin with the creation of an initial document 150 via the document creation platform 180 provided by the enhanced document creation system 110, which may be encoded in accordance with a defined schema and stored as a structured document in document database 116 in association with a unique document identifier (401). In response to a user request to export the initial document 150 (403), the enhanced document creation system 110 may retrieve the structured document from document database 117 and desensitize the document by removing any sensitive information (e.g., SSN, photograph, etc.) (402). The enhanced document creation system 110 may then ask the user 101 whether they wish to add or update any interactive elements 152 in the document or whether they have been finalized (404). If the user 101 decides to add or update interactive elements 152, the user may be presented with a set of available or existing interactive elements 152 to choose from (405). Based on the user's selection, the document creation platform 180 may add one or more interactive elements 152 to the initial document 150 (406), retrieving corresponding element definitions from element definition database 215 and prompting the user 101 for any underlying information necessary to support the functionality of the interactive elements 152 in the process, which may then be stored in user-reviewer data database 217 (407). Once complete, the enhanced document creation system 110 may encode the section and update the structured document in document database 216 accordingly (408).

The enhanced document creation system 110 may then translate the structured and desensitized document into a target schema (410). The enhanced document creation system 110 may use this desensitized document to render the initial document 150 in a particular file format (e.g., Microsoft Word's DOCX format or Adobe Acrobat's PDF format) (411), which in some embodiments, may be designated by a user 101 (412). The initial document 150 may be rendered in accordance with a particular document skin definition, which may be loaded from document skin library 214*a* (413). The enhanced document creation system 110 may then determine whether to embed the structured document in the rendered document (created at 411) or whether to embed the document identifier associated with the structured document (414). The structured document or document identifier associated therewith may then be embedded as a byte string in the rendered document (created at 411) forming the enhanced document 151 (415).

Figure 5:
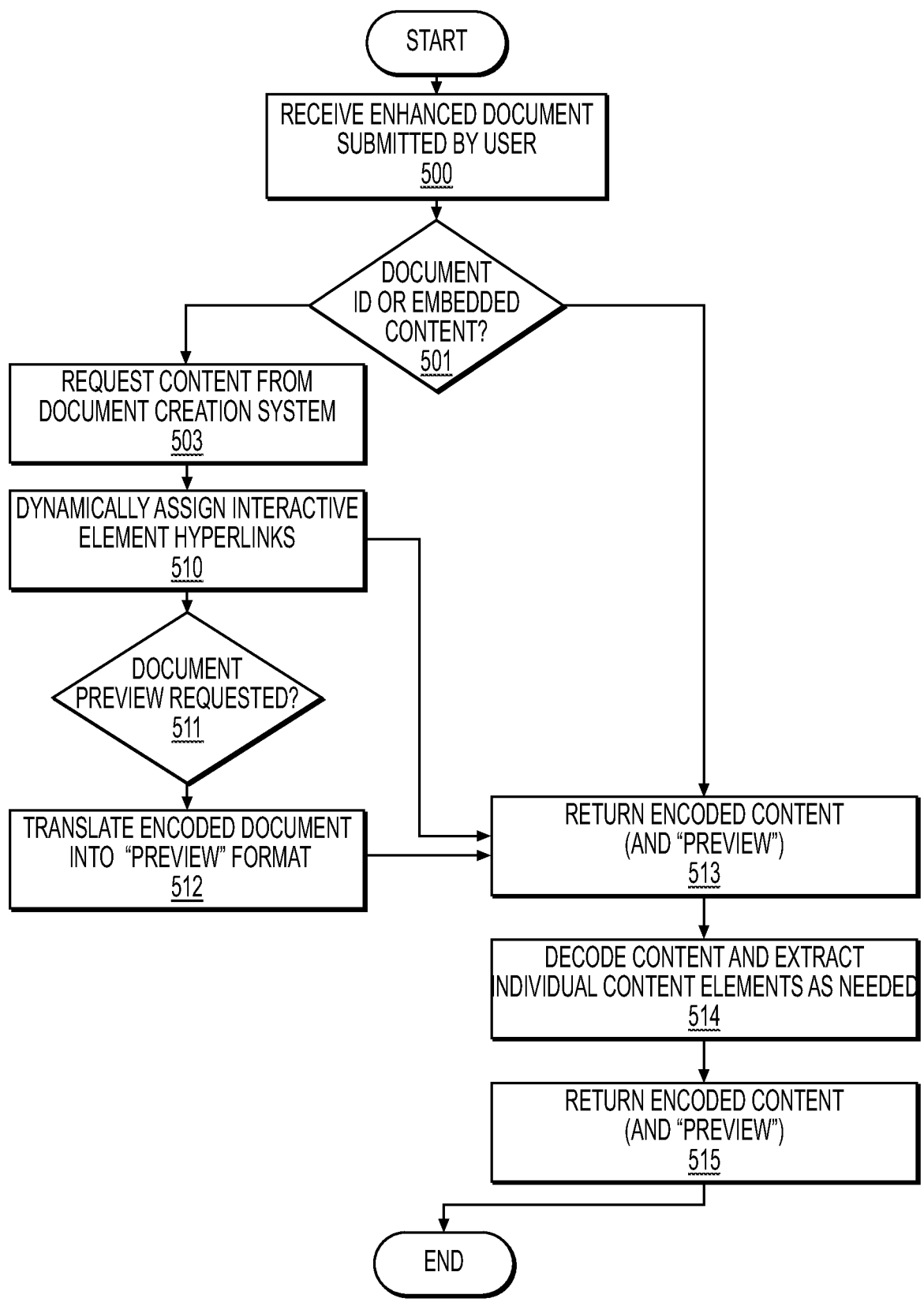
FIG. 5 depicts a high-level logic flow that the enhanced document creation system and document parsing system may employ in parsing an enhanced interactive document.

FIG. 5 depicts an exemplary logic flow that the enhanced document creation system 110 and document parsing system 130 may employ in parsing an enhanced interactive document 151. The process may begin with the receipt of an enhanced document 151 from document submission system 160 for parsing by document parsing system 130 (500). The document parsing system 130 may then determine whether the received document is in fact an enhanced document 151 whether it has an exported document identifier embedded therein (501). If so, the document parsing system 130 may extract the exported document identifier and request the associated structured document from the enhanced document creation system 110 (503).

In response to the request, the enhanced document creation system 110 may retrieve the encoded document content associated with the identifier, and dynamically assign unique URLs to any interactive element 152 encoded therein (510). The enhanced document creation system 110 may also determine whether a document "preview" format (e.g., an HTML or RTF output) has been requested (511), and if so, may translate the encoded document content with dynamically assigned URLs into the requested document "preview" format (512). The enhanced document creation system 110 may then return the encoded document content with dynamically assigned URLs and, optionally, the document "preview" to document parsing system 130 (513). Document parsing system 130 may decode the encoded document content and extract individual content elements as needed (514), which may be returned to the document review system 140 (optionally) with the document "preview" (515).

Figure 6:
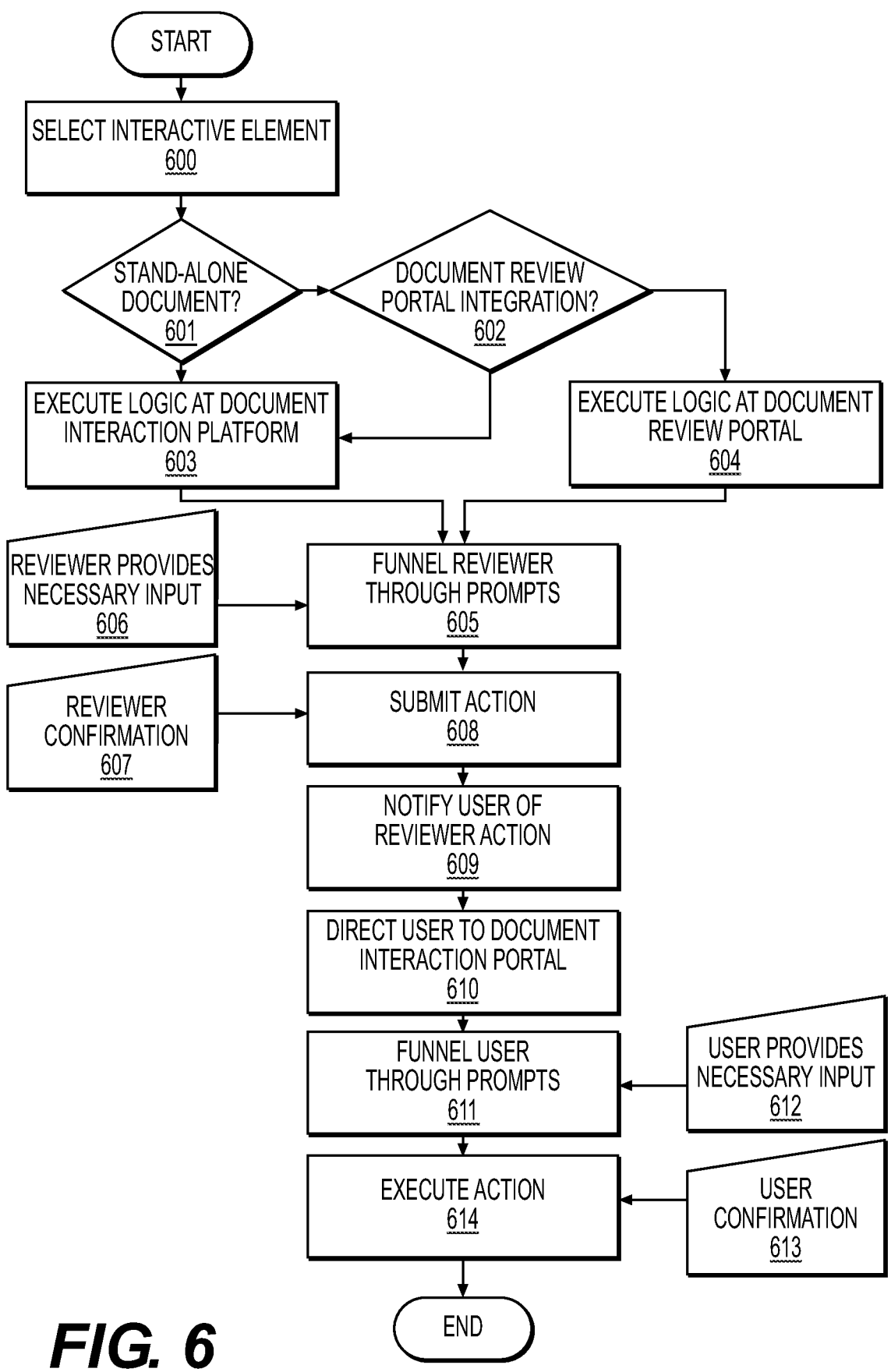
FIG. 6 depicts a high-level logic flow of a user reviewer interaction process.

FIG. 6 depicts an exemplary logic flow of a user-reviewer interaction process, which may begin with a reviewer 103 selecting an interactive element 152 of an enhanced document 151 to take the action associated therewith (600). A determination is made as to whether the reviewer 103 made the selection from a stand-alone resume or from within a document review portal 145 hosted by the document submission system 160 (601), and if the latter, whether the document review portal 145 supports some form of interactive element 152 integration (e.g., has an appropriate plug-in or extension installed) (602). If the request was initiated from a stand-alone document or the document review portal 165 does not support integration of the interactive element 152, the reviewer 103 may be directed to a document interaction platform 171 hosted by the user-reviewer interface system 170 (603). Alternatively, the interactive element functionality may be triggered within the document review portal 165 itself (604).

The reviewer 103 may then be funneled through a series of prompts soliciting any additional information or input from the reviewer 103 (605). Once the reviewer 103 has provided the requisite information and/or input and the reviewer 103 confirms that the desired action should be taken (606, 607), the user-reviewer interface system 170 may take appropriate action (608). The user-reviewer system 170 may then send a notification to the user 101 regarding the reviewer's action (e.g., via an SMS message, e-mail message, mobile application, or user dashboard provided through document interaction platform 171) (609).

The user 101, upon receipt of the notification, may request to view additional event details (e.g., by selecting a hyperlink within the notification), and in response, may be directed to the document interaction platform 171 (610). If additional action or input by the user 101 is required, the document interaction platform 171 may funnel the user 101 through a series of prompts soliciting the required information (611). Once the user 101 has provided the requisite information and/or input and confirmed that the desired action should be taken (612, 613), the user-reviewer interface system 170 may take appropriate action (614).

While specific embodiments of the invention have been described above, it will be appreciated that the invention may be practiced other than as described. The embodiment(s) described, and references in the specification to "one embodiment," "an embodiment," "an example embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

The description provided above is intended to be illustrative and non-limiting. Thus, it will be apparent to one skilled in the art that modifications may be made to the present invention as described without departing from the scope of the claims set out below. Moreover, while the above description was provided with reference to the creation and parsing of an enhanced resume document, the invention is not thus limited, and may be naturally extended to other contexts.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The invention claimed is:

1. A method for creating an enhanced document, comprising:
   providing a document creation platform to an applicant, the document creation platform configured to receive résumé information;
   creating, on a first device, an initial document having a first set of human readable information and a style template by the applicant, wherein the first set of human readable information is resume information divided into a plurality of sections, wherein the document creation platform allows the applicant to select a style template to apply to the initial document;
   storing the résumé information in a document database as structured data according to a structured schema;
   receiving, from the applicant, a selection of an interactive element from a list of interactive elements, wherein an appearance of the interactive element is based on at least one of a style template selected by the applicant that is applied to the initial document or the applicant adjusting attributes of the interactive element;
   prompting the applicant to provide additional information for supporting a functionality of the interactive element, wherein the functionality comprises an exchange between a recipient and the applicant after activation of the interactive element, the exchange based on the additional information;
   receiving, from the applicant, the additional information for supporting the functionality of the interactive element;
   encoding the additional information in accordance with the structured schema;
storing the encoded additional information for supporting the functionality of the interactive element within the document database in association with a document identifier;
   generating the interactive element for a section from the plurality of sections, wherein activation of the interactive element provides access to supplemental information associated with the section;
   assigning a unique universal resource locator (URL) each time the enhanced document is downloaded by a different recipient, wherein each of the unique URLs direct the different recipient to the supplemental information;
   storing the unique URL in association with each different recipient of a document submission of the enhanced document;
   embedding the interactive element having the unique URL in association with the section;
   creating the enhanced document from the initial document, the structured data, and the interactive element, the enhanced document including the structured data associated with the document identifier, wherein the document identifier is embedded as non-visible metadata usable to request content of the enhanced document;
   transmitting the enhanced document to at least one second device, wherein the unique URL is unique to the document submission transmitted to a recipient at the at least one second device;
   receiving an activation of the interactive element by the at least one second device;
   providing, to the at least one second device, access to the supplemental information affiliated with the interactive element using the unique URL;
   tracking activation of the interactive element by the at least one second device; and
   transmitting, to the first device, a notification indicating activation of the interactive element by the at least one second device.

2. The method of claim 1, wherein the section includes summary biographical information.

3. The method of claim 2, wherein the supplemental information includes additional biographical information.

4. The method of claim 1, wherein the first set of human readable information includes a collection of information containing a number of sets of information that are selectable by the first device.

5. The method of claim 1, wherein the initial document is a resume, a cover letter, or a curriculum vitae.

6. The method of claim 4, wherein the collection of information includes a collection of skills, employment, and a professional summary.

7. The method of claim 1, wherein the supplemental information accessible through the interactive element includes a calendar, a website, personal videos, a portfolio, references, a work schedule, skill sets, hobbies, photos, articles, licenses, certifications, academic transcripts, background information, work eligibility, insurance, travel requirements, disability, gender and ethnic information, or combinations thereof.

8. The method of claim 7, wherein the first device may customize an arrangement of additional interactive elements in the enhanced document.

9. The method of claim 1, further comprising providing the list of interactive elements to the applicant via one or more widgets contained within an editor of the document creation platform.

10. The method of claim 1, further comprising retrieving the stored additional information based on the activation of the interactive element by the at least one second device.

11. A non-transitory computer readable medium having stored thereon a program executable by a computer for creating an enhanced document comprising:
   providing a document creation platform to an applicant, the document creation platform configured to receive résumé information;
   creating, on a first device, an initial document having a first set of human readable information and a style template by the applicant, wherein the first set of human readable information is resume information divided into a plurality of sections, wherein the document creation platform allows the applicant to select a style template to apply to the initial document;
   storing the résumé information in a document database as structured data according to a structured schema;
   receiving, from the applicant, a selection of an interactive element from a list of interactive elements, wherein an appearance of the interactive element is based on at least one of a style template selected by the applicant that is applied to the initial document or the applicant adjusting attributes of the interactive element;
   prompting the applicant to provide additional information for supporting a functionality of the interactive element, wherein the functionality comprises an exchange between a recipient and the applicant after activation of the interactive element, the exchange based on the additional information;
   receiving, from the applicant, the additional information for supporting the functionality of the interactive element;
   encoding the additional information in accordance with the structured schema;

storing the encoded additional information for supporting the functionality of the interactive element within the document database in association with a document identifier;

generating the interactive element for a section from the plurality of sections, wherein activation of the interactive element provides access to supplemental information associated with the section;

assigning a unique universal resource locator (URL) each time the enhanced document is downloaded by a different recipient, wherein each of the unique URLs direct the different recipient to the supplemental information;

storing the unique URL in association with each different recipient of a document submission of the enhanced document;

embedding the interactive element having the unique URL in association with the section;

creating the enhanced document from the initial document, the structured data, and the interactive element, the enhanced document including the structured data associated with the document identifier, wherein the document identifier is embedded as non-visible metadata usable to request content of the enhanced document;

transmitting the enhanced document to at least one second device, wherein the unique URL is unique to the document submission transmitted to a recipient at the at least one second device;

receiving an activation of the interactive element by the at least one second device;

providing, to the at least one second device, access to the supplemental information affiliated with the interactive element using the unique URL;

tracking activation of the interactive element by the at least one second device; and transmit, to the first device, a notification indicating activation of the interactive element by the at least one second device.

12. The non-transitory computer readable medium of claim 11, wherein the supplemental information includes a calendar, website, personal videos, portfolio, references, work schedules, skill sets, hobbies, photos, articles, licenses, certifications, academic transcripts, background information, work eligibility, insurance, travel requirements, disability, gender and ethnic information, or combinations thereof.

13. The non-transitory computer readable medium of claim 11, wherein the first set of human readable information includes a collection of skills, employment, or a professional summary.

14. The non-transitory computer readable medium of claim 11, wherein a second interactive element in the enhanced document is a different type than the interactive element.

15. The non-transitory computer readable medium of claim 11, wherein the interactive element is a button, an image, a machine-readable code, or formatted-text.

16. A method for creating an enhanced document, comprising:

providing a document creation platform to an applicant, the document creation platform configured to receive résumé information;

creating, on a first device, an initial document having a first set of human readable information and a style template by the applicant, wherein the first set of human readable information is resume information divided into a plurality of sections;

storing the resume information in a document database as structured data according to a structured schema;

generating an interactive element for a section from the plurality of sections, wherein activation of the interactive element provides access to supplemental information associated with the section;

assigning a unique universal resource locator (URL) to the interactive element for each version of the enhanced document downloaded by a different recipient of a document submission, wherein each of the unique URLs direct the different recipient to the supplemental information;

storing the unique URL in association with each version of the enhanced document;

embedding the interactive element having the unique URL in association with the section, the unique URL is unique to a document submission transmitted to a recipient on at least one second device;

encoding document content associated with the initial document, the interactive element, and additional information for supporting a functionality of the interactive element in accordance with the structured schema;

storing, within the document database, the encoded document content, the encoded interactive element and the encoded additional information in association with a document identifier;

creating the enhanced document from the initial document, the structured data, and the interactive element, the enhanced document including the document identifier for retrieving the encoded document content, wherein the document identifier is embedded as non-visible metadata, tracking activation of the interactive element by the recipient of the document submission for each version of the enhanced document; and transmitting, to the first device, a notification indicating activation of the interactive element by the at least one second device.

* * * * *